United States Patent [19]
Overbury

[11] Patent Number: 5,832,032
[45] Date of Patent: Nov. 3, 1998

[54] INTERFERENCE REDUCTION IN TELECOMMUNICATIONS SYSTEMS

[75] Inventor: Francis Giles Overbury, Great Dunmow, United Kingdom

[73] Assignee: Northern Telecom Limited, Montreal, Canada

[21] Appl. No.: 739,491

[22] Filed: Oct. 28, 1996

[30] Foreign Application Priority Data

Nov. 9, 1995 [GB] United Kingdom .................... 9523016

[51] Int. Cl.[6] ..................................................... H04K 1/02
[52] U.S. Cl. .......................... 375/285; 370/201; 370/282; 379/406; 379/410
[58] Field of Search ..................................... 375/346, 349, 375/254, 278, 285; 370/201, 282, 284; 379/410, 411, 406

[56] References Cited

U.S. PATENT DOCUMENTS

| | | |
|---|---|---|
| 4,186,349 | 1/1980 | Gordy et al. . |
| 4,270,223 | 5/1981 | Marston . |
| 5,047,736 | 9/1991 | Ghose . |
| 5,410,750 | 4/1995 | Cantwell et al. . |

*Primary Examiner*—Wellington Chin
*Assistant Examiner*—Conguan Tran
*Attorney, Agent, or Firm*—John D. Crane

[57] ABSTRACT

Interference on a differential signal received at a first input to a digital data system processor is minimised or cancelled by summing a weighted portion of a local field signal with the differential signal. The local field signal may be a common-mode signal from the same line as the differential signal received at a second input. Weight may be a complex weight which shifts the local field signal in amplitude and phase. A weight control signal is derived from a comparison processor which compares the processed outputs of signal processors. Signal processors are preferably Discrete Multitone processors. Several iterations of this technique may be performed to establish an accurate weighting value.

15 Claims, 5 Drawing Sheets

S/P = serial to parallel converter
t = time index for each IFFT cycle
N = 2Ns
T = symbol period of DMT modulator

INTERFERENCE REDUCTION IN TELECOMMUNICATIONS SYSTEMS

TECHNICAL FIELD

This invention relates to telecommunications systems and particularly, but not exclusively, to reducing interference when transmitting data signals over a subscriber loop.

BACKGROUND OF THE INVENTION

Public telecommunications networks were originally developed to provide voice communications between subscriber terminals. In recent years traditional wire has been replaced by fibre optics for long distance communications. With the expansion of such networks from the traditional telephone or POTS service into the provision of a variety of digital services, there is now a need to provide improved subscriber access to the network. Presently data traffic operates at frequencies below 5 KHz. Increasing amounts of data traffic are beginning to saturate the available channels and higher operating frequencies are required to handle the increasing amounts of data, for example, to provide video-on-demand services, direct digital broadcasts, and high capacity links for computers.

Typically subscribers are coupled to a telecommunications network with a twisted pair wire loop commonly referred to as the subscriber loop. This twisted pair connects to a node associated with an optical distribution network which can be some 1000 m away from the subscriber. Such an arrangement is depicted in FIG. 1. The first 950 m or so of cabling 12 from a junction box 10 is carried underground by trunking containing many twisted pairs of underground feeders 14, and the final 50 m or so of wire from a distribution point 16 to a subscriber's installation is normally above ground and consists of an individual twisted pair 18 to each house 20. Thus, for the last length of cable, the wires are ordinary telephone wires. If a subscriber's equipment is located proximate to a source of radio interference, for example transmissions from a radio amateur, then signals can be picked up very strongly on the two wires.

Typically, in twisted pair copper loop networks, signals are transmitted in differential mode; that is to say, the signals are transmitted along both wires and any Radio Frequency Interference (RFI) will be picked up by both wires approximately equally with the wanted signal being determined by the differential signal between the two wires, at the receiver. Since high speed data is transmitted in this fashion, there should be no transmission problems in such an arrangement. However, there may be a certain amount of breakthrough between the common mode and the differential mode and although interference is predominantly received in common mode, some interference may leak through to the differential-mode. Differential interference signals may be up to 30 dB lower than the common mode interference signals, but this can cause problems if it is strong enough to distort the output of the associated analogue-to-digital converter, ADC, at the receiver in addition to providing an increase in the background interference, resulting in a corresponding decrease in the output carrier-to-noise ratio, CNR.

FIG. 2 shows a typical received signal and noise levels for a 1000 m copper loop shown in FIG. 1. There are two dominant types of 'noise' which will limit the available CNR across the band: White (W) noise at −140 dBm/Hz across the band and far end cross talk noise, FEXT, from other twisted pairs in the distribution cables. The costs of replacing these loops with more efficient or higher bandwidth connections, e.g. a coaxial connection, is prohibitive and various techniques have therefore been proposed for providing effective digital communications data across the subscriber loop.

In many countries radio transmissions are regulated in the 1–10 MHz region. For instance, in the United Kingdom, amateur radio transmissions are allowed over the 1.81–2.0, 3.5–3.8 and 7.0–7.1 MHz bands and these transmissions may be up to 400 W ERP from omnidirectional antennas using, for example, 2–3 KHz SSB modulation. Such allowed bands are known to couple onto the overhead telephone lines forming the last section of the copper loop. In the case of FIG. 1, the last 50 m of the copper loop to the subscriber. In this example, at this point in the transmission path, the signal will already have been attenuated by 950 m of underground cable and will therefore be very susceptible to interference. As discussed earlier, the interference will induce common mode voltages on the cable which will in turn appear as a differential voltage attenuated by the common mode rejection ratio, CMRR, of the cable. A typical broadband CMRR figure is 30 dB for one of these cables. This type of interference is particularly noticeable on lines operating with discrete multitone DMT Modulation schemes which provide very asymmetric digital subscriber line, VADSL, services to subscribers.

As a result of interference induced on a transmission line, it may be necessary to cease using channels which are corrupted by the interference, or alternatively to provide additional coding on the affected channels to better protect them from corruption. Both of these methods reduce the bandwidth which is available for the transmission of data.

It is an object of the present invention to reduce the effects of interference and, in particular, the interference generated from sources such as amateur radio transmitters when schemes such as Discrete Multitone Modulation are used on domestic telephone lines to provide digital services to subscribers. It is a further object of the present invention to protect data from corruption by interference without putting constraints on the bandwidth available on a transmision line.

SUMMARY OF THE INVENTION

In accordance with the present invention there is provided a digital data system processor having a first input to receive a differential signal and a second input to receive a local field signal, the processor being arranged to:

separately process the differential and local field signals;

compare characteristics of the processed differential and local field signals to derive a weight control signal;

set a weight according to the weight control signal;

sum a weighted portion of the local field signal with the differential signal whereby to minimise or cancel interference in the differential signal.

In accordance with another aspect of the invention, there is provided a digital data system processor comprising:

a first input to receive a differential signal;

a second input to receive a local field signal;

a summer coupled to the first input;

a first signal processor coupled to an output of the summer for processing the differential signal;

a second signal processor coupled to the second input for processing the local field signal;

a comparison processor coupled to outputs of the first and second signal processors arranged to compare characteristics of the processed signals and to derive a weight control signal; and a weight coupled between the second input and the summer and being responsive to the weight control signal, whereby a weighted portion of the local field signal is summed with the differential signal to minimise or cancel interference in the differential signal.

In accordance with a further aspect of the invention, there is provided a method of reducing the effect of interference in a digital data processor which receives a differential signal at a first input and a local field signal at a second input, the method comprising:

separately processing the differential and local field signals;

comparing characteristics of the processed differential and local field signals to derive a weight control signal;

setting a weight according to the weight control signal;

summing a weighted portion of the local field signal with the differential signal whereby to minimise or cancel interference in the differential signal.

Preferably the comparison processor compares amplitudes and/or phase of the processed local field and differential signals. Preferably the comparison processor correlates the processed local field and differential signals. Correlation techniques can use phase information to derive an appropriate weight, even where limiting has corrupted amplitude information.

The weight is preferably a complex analogue weight which will appropriately scale and phase shift the local field signal such that, when it is combined with the differential signal, the resultant interferer is decreased.

Preferably the differential and local field signals are derived from a common transmission line, the local field signal being a common-mode signal from the line. The common-mode signal will almost entirely comprise interference of the type affecting the differential-mode signal, thereby providing a good signal source, when appropriately weighted, for cancelling the interference on the differential-mode.

Preferably the signal processors each comprise a cascade arrangement of an analogue-to-digital converter, and a Fast Fourier Transform decoder.

BRIEF DESCRIPTION OF THE DRAWINGS

In order to enable a greater understanding of the invention to be attained, reference will now be made, by way of example, to the figures as shown in the accompanying drawing sheets, wherein.

DESCRIPTION OF PREFERRED EMBODIMENTS

Figure 1:
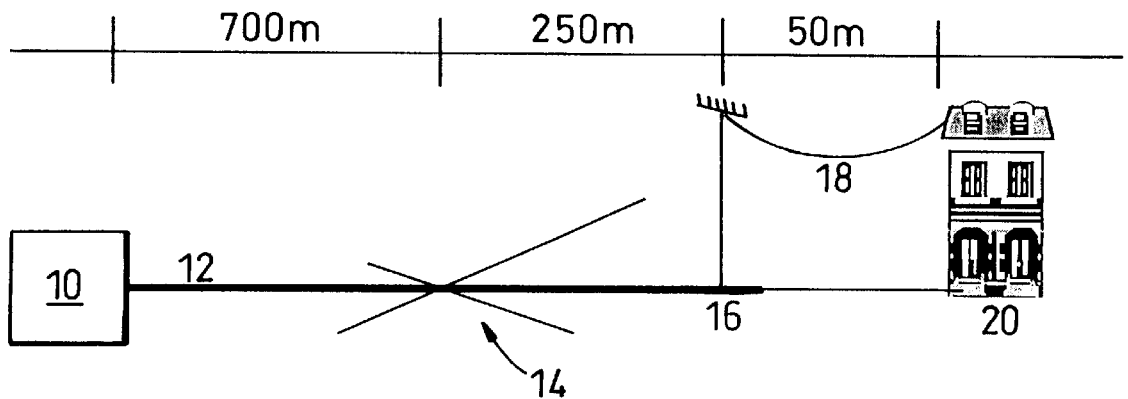
FIG. 1 shows a twisted pair copper loop which connects a node associated with an optical distribution network to a subscriber.
Figure 2:
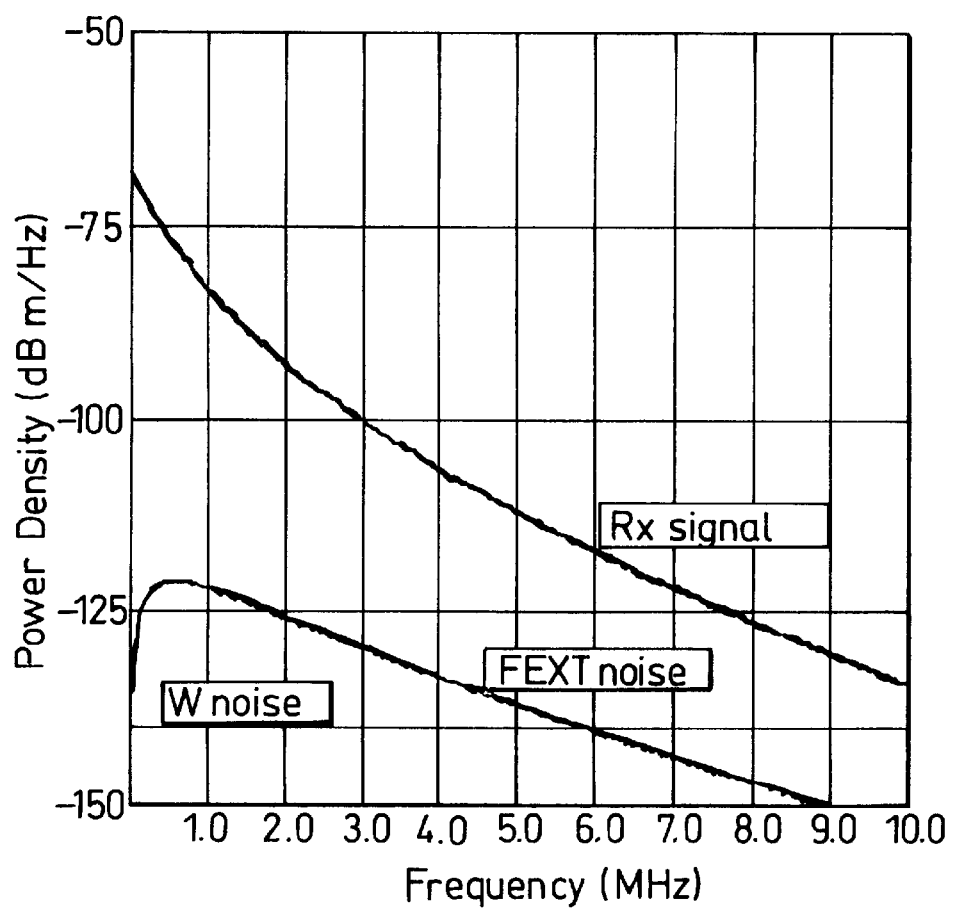
FIG. 2 shows the received signal and noise levels for the 1000 m copper loop shown in FIG. 1.
Figure 3:
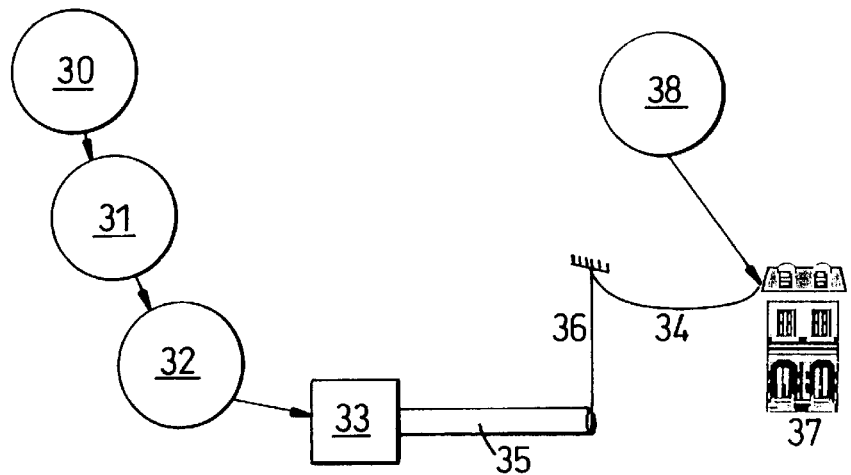
FIG. 3 shows a high-capacity telecommunications system for delivering services to a subscriber.

FIG. 3 shows a representation of a high speed data link suitable for the transmission of both digital data (such as Very Asymmetric Digital Subscriber Loop, VADSL, schemes) and analogue data, according to an embodiment of the invention. A broadcast centre 30 provides, for example, a digital video-on-demand service; this data is modulated by a modulator 31 and transmitted through a high capacity transmission medium, such as an optical fibre network 32. The optical fibres could support data links for hundreds of video subscribers. Through various trunking arrangements a fibre will terminate at a street-level junction box 33 which may serve several subscribers. At this junction box there will be a modulator to serve each subscriber; data will be modulated by these modulators onto twisted pair wire carriers 34. As described in relation to FIG. 1, these twisted pair carriers will be directed through underground trunking 35 until they are required to be supported by pylons and the like 36 when proximate to subscriber's premises 37. The twisted pairs, upon entry to the subscriber's premises, will be passed to demodulation means 38 prior to the data signals being passed to telephones and modems for video on demand, computer networking services and the like. Interference will be picked up by the twisted pairs most readily during transmission from the pylon to the subscriber's premises.

Discrete Multitone modulation (DMT) is a form of multicarrier modulation which superimposes several carrier-modulated waveforms to represent a bit stream. The standard DMT modulator is based on an Inverse Fast Fourier Transform (IFFT) and the standard DMT demodulator is based on a Fast Fourier Transform (FFT). One of the problems with the demodulator is its susceptibility to narrow band interferers. In the DMT system all the sub-carriers are orthogonal and are treated as independent carriers when demodulated by the FFT. However, a narrow band interferer will not be orthogonal and will be spread by the FFT into many of the demodulated sub-carrier decoded channels, causing a decreased CNR, even though the interferer may only be in one sub-carrier band.

Figure 4:
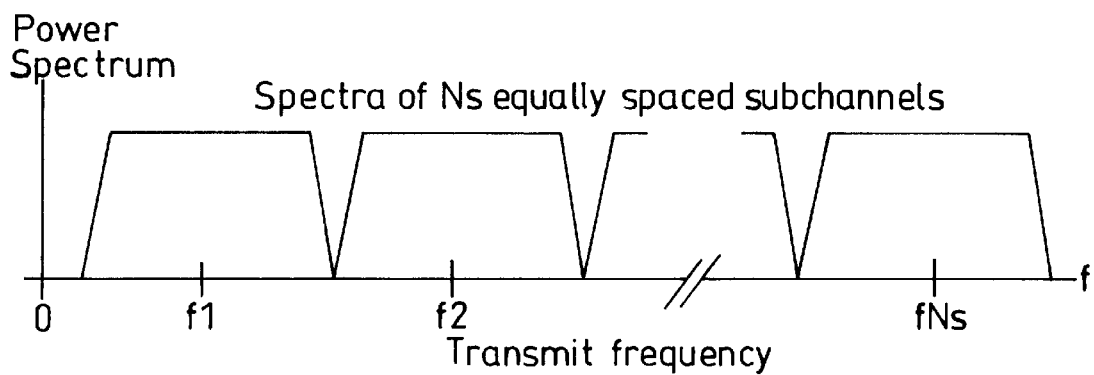
FIG. 4 shows the transmitted power spectrum of a multicarrier waveform.

FIG. 4 illustrates the transmitted power spectrum of a multicarrier waveform. The multicarrier transmit signal is the sum of the independent sub-channels, each of equal bandwidth and with centre frequency $F_i$; where i=1 . . . Ns=number of sub-channels. Each of the sub-channels could be a QAM modulated signal.

Figure 5:
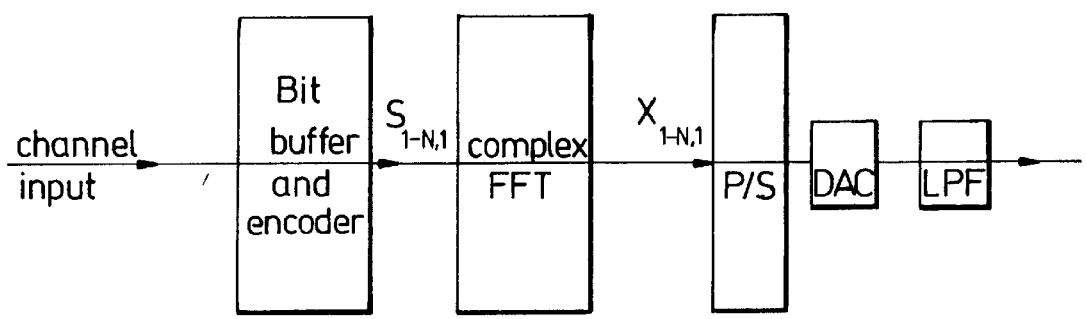
FIG. 5 shows a basic DMT modulator.

A basic DMT modulator is shown in FIG. 5 and comprises an input bit stream buffer, an inverse fast Fourier transform unit, a serial formatting unit, a digital-to-analogue converter and an output low pass filter (LPF). In such an arrangement, an input bit stream of data rate R bps is buffered into blocks of $T_b$ bits by the buffer, where $T_b$ is the total no of input bits per modulator symbol. $T_b$ is given by the product of the data rate and the symbol period (T) of the DMT modulator. These $T_b$ bits will be divided amongst the sub-channels, each sub-channel carrying $b_i$ bits.

Figure 6:
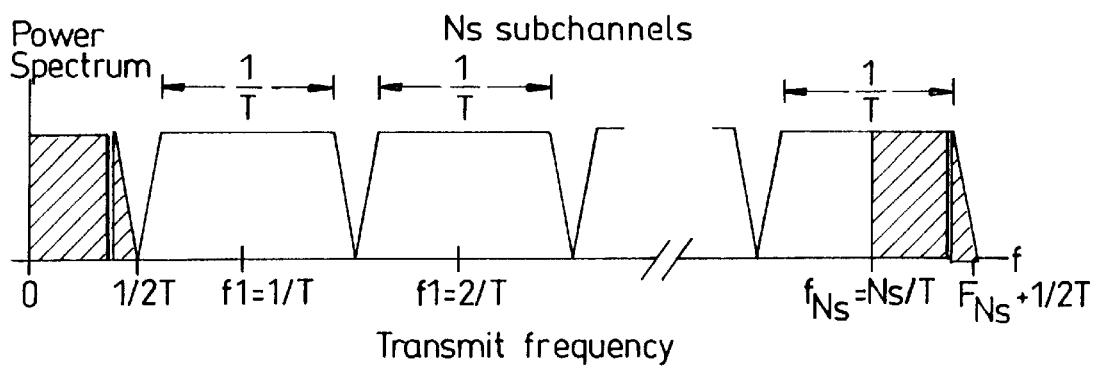
FIG. 6 shows an output spectrum from a DMT modulator.

These $b_i$ bits for each of the $N_s$ sub-channels are translated by the DMT encoder into a complex sub-symbol $S_i$, for each sub-channel. Each subchannel has $2^{b_i}$ possible QAM symbol states. The 2 $N_s$ point IFFT unit combines the Ns subsymbols into a set of N real-valued time domain samples, $X_n$, t; where n=1 . . . N, and t represents the sample time. These N samples are successively applied (in serial format) to a digital-to-analogue converter, DAC, which samples at a rate N/T—which is the sampling rate of the DMT modulator—to create a symbol for the DMT modulator. The output of the DAC is a continuous-time modulated signal x(t) which is a succession of DMT symbols each formed from N time domain samples. The output spectrum of the DMT modulator of FIG. 5 is shown in FIG. 6. The sub-channels are centred on $F_{i=i/T}$.

Figure 7:
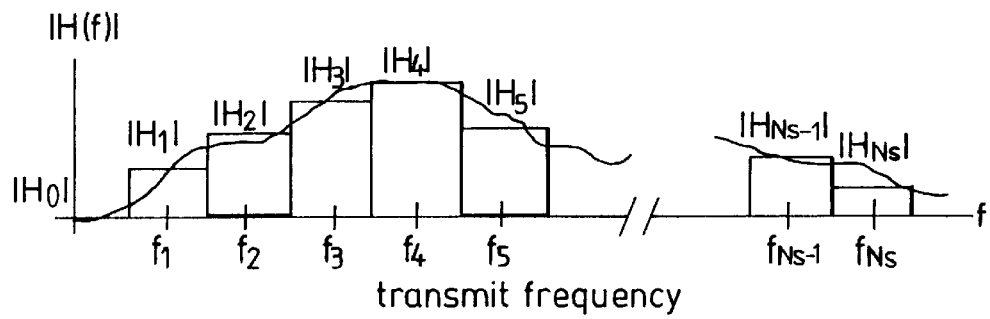
FIG. 7 shows the decomposition of a multi-channel signal.
Figure 8:
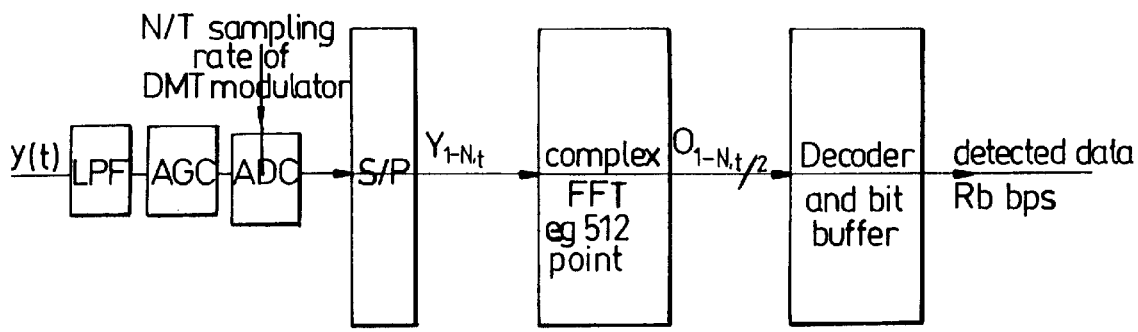
FIG. 8 shows a prior art DMT demodulator.

As $N_s$ increases, the continuous transfer function of the transmission medium can be approximated as a discrete curve—see FIG. 7. Each of the rectangles is a band of frequencies 1/T Hz wide with the centre frequency $f_i$ and corresponds to the DMT sub-channel centre frequencies. When Ns is large the noise can be shown to be independent even if the noise spectrum is not flat. FIG. 8 shows a type of DMT demodulator, which comprises an input low pass filter (LPF), Automatic gain control means (AGC), an analogue-to-digital converter (ADC), a serial formatting unit (SF), a fast Fourier transform unit (FFT), and an output bit stream buffer. In the presence of a narrow band interferer, the data rate of the DMT system can be severely reduced and could degrade to an unacceptable level.

Figure 9:
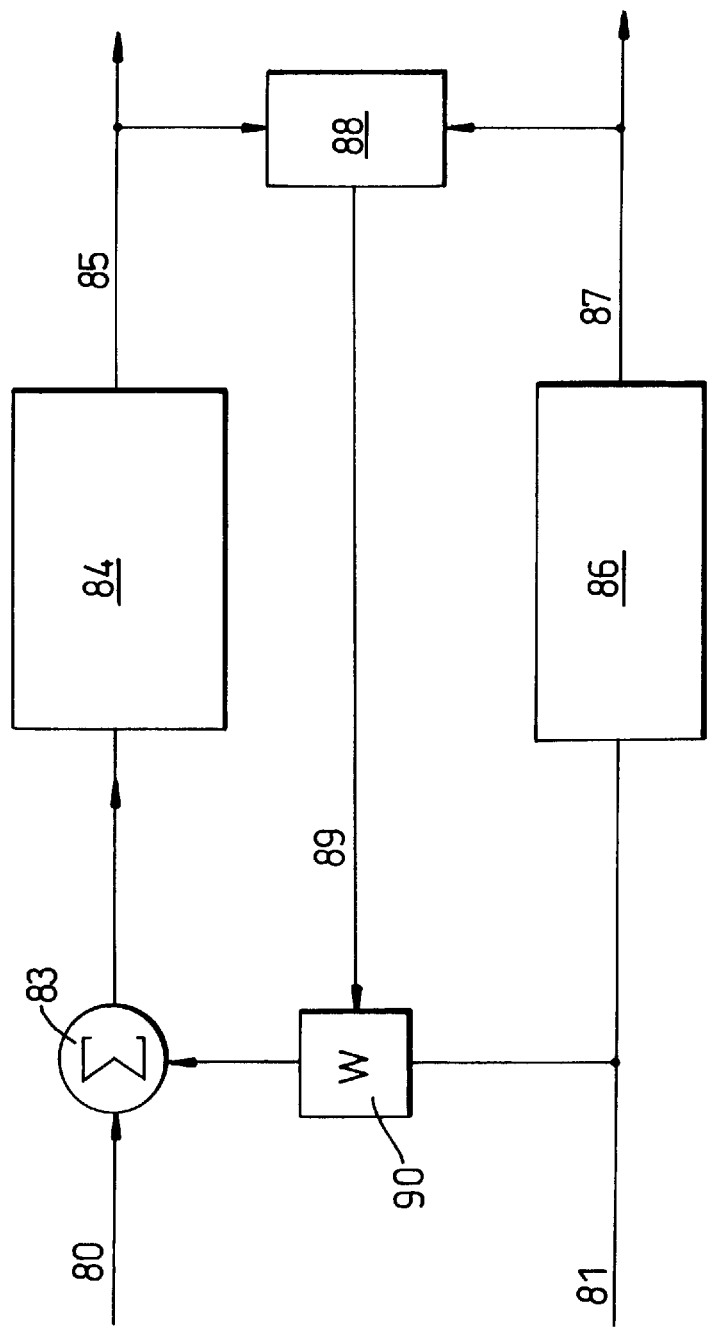
FIG. 9 is a block diagram of a processor in accordance with an embodiment of the invention.

FIG. 9 schematically shows a processor suitable for use in the system shown in FIG. 3. A differential-mode signal from a transmission line is received at a first input 80, and a local field signal is received at a second input 81. The wanted data signal is transmitted in differential-mode but may also contain some unwanted radio frequency intereference. The local field signal received at input 81 will mainly comprise interference. A summer 83 combines the differential-mode signal with a portion of the local field signal. That portion is determined by a weight 90 which joins the differential-mode and local field lines. The weight receives a weight control signal 89 from a processor 88. The weight is preferably a complex weight which scales and shifts the local field signal in phase such that it combines with the differential-mode signal at summer 83 to minimise or cancel interference.

Signal processors 84 and 86 separately process the differential-mode and local field signals to produce respective processed outputs 85 and 87. A further processor 88 compares characteristics of the processed outputs 85, 87 to derive a weight control signal 89 for controlling weight 90. The characteristics which are compared are preferably amplitude and phase of the processed signals. A preferred form of comparison is a correlation technique. If correlation between the interference in the local field signal output 87 and at the wanted differential-mode signal output 85 is effected after narrow-band filtering to remove noise-like components, a deep cancellation null will result. The benefit of calculating a required weight from decoded outputs 85,87 rather than by using a perturbation technique is that complete or near complete cancellation can be effected after a single iteration. Further iterations may be performed to increase the depth of a cancellation null, such as where cancellation of interference is required to a level below that of the wanted signal. As an example, a first iteration may reduce differential-mode interference by 20–30 dB, and a second iteration by a further 20–30 dB.

A first iteration of the technique comprises the following steps. Initially it is preferable to set the weight to zero, such that none of the local field signal is combined with the differential-mode signal. Each signal is processed separately, the processed signals are compared and a weight control signal is derived. Weight 90 is then set to the value indicated by the control signal, thereby coupling a part of the local field signal to summer 83 where it is combined with the differential mode signal to minimise interference in the wanted (differential-mode) signal. In subsequent iterations of the technique the improved differential mode signal, which now has a significant amount of the interference cancelled, is compared with the local field signal.

The weight is preferably a complex weight which scales and shifts the phase of the local field signal. It may also be advantageous to incorporate a variable delay into the weighting element.

Suitable weighting elements are known in the art. One particular kind of weighting element comprises a pair of cascade arrangements of a local oscillator and a variable attenuator, the local oscillators being offset in quadrature. An input to the weight is fed to each local oscillator and an output from the weight is taken from each attenuator and summed. Other weighting elements may be used.

The local field signal is preferably a common-mode signal derived from the same transmission line as the differential-mode signal. Alternatively it could be taken from another source such as an antenna, another cable, or a pipe acting as an antenna.

Figure 10:
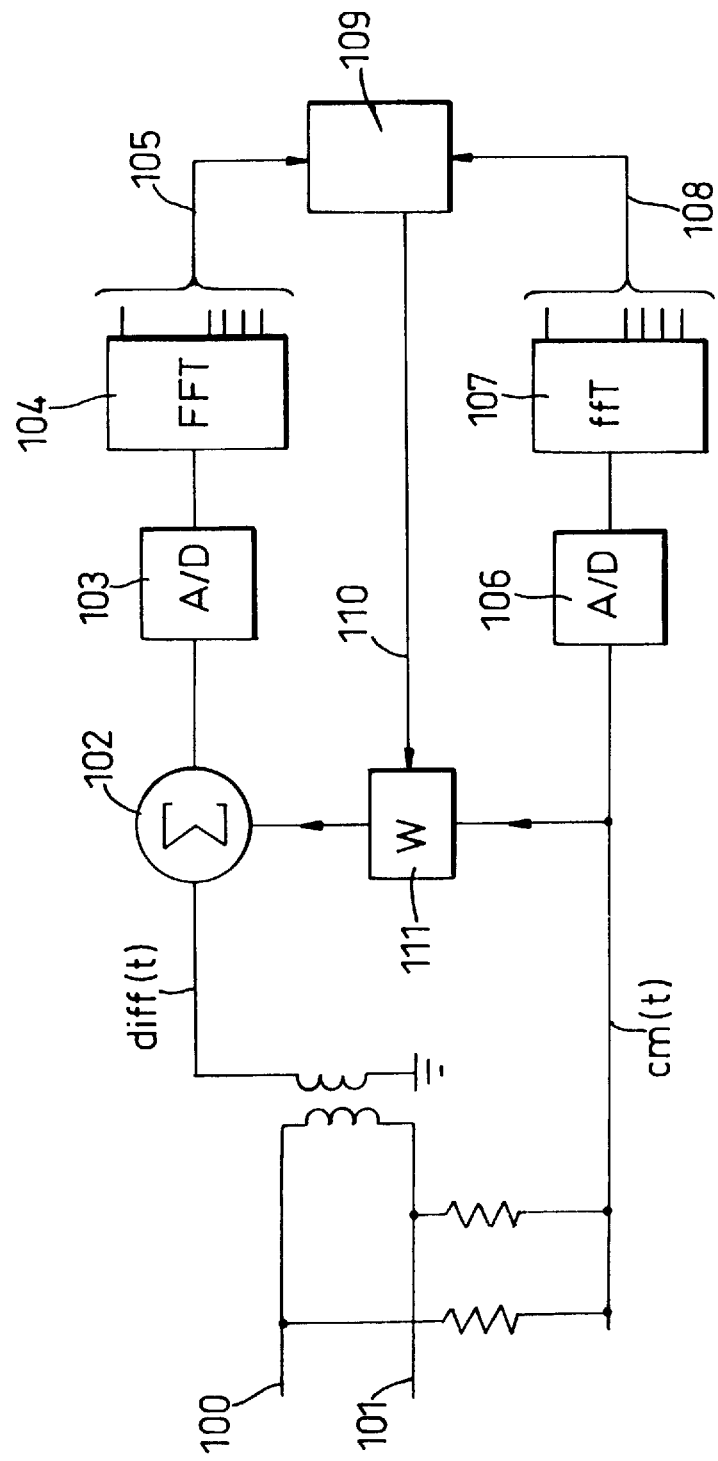
FIG. 10 shows a preferred form of processor for use in a digital subscriber line system.

FIG. 10 shows a preferred form of processor in more detail, coupled to a digital subscriber line system. In this arrangement the processor would be called a demodulator. A data transmission line, such as a twisted pair subscriber loop, has wires 100, 101. A differential signal diff(t) and a common-mode signal cm(t) are derived from this transmission line and applied to the demodulator inputs. Summer 102 combines a weighted portion of the common-mode signal cm(t) with the differential-mode signal diff(t).

The differential-mode and common-mode signals are separately processed in a similar manner. Firstly, an analogue-to-digital converter A/D 103, 106 forms a digital representation of the incoming signal. A signal processor 104, 107 then extracts data from the digitised signal. For a DMT system, the signal processor applies a Fast Fourier Transform (FFT) to derive a set of in-phase (I) and quadrature (Q) outputs. Knowing the I and Q signal components allows the amplitude and phase of the signals to be readily calculated. That is, amplitude=$\sqrt{(I^2+Q^2)}$, and phase=$\tan^{-1}$(Q/I). Processor 109 receives amplitude and phase information from outputs 105 and 108. By taking a ratio of the amplitudes of the interference as seen at 105 (common-mode) and 108 (wanted signal plus interference) and comparing the phase of those same signals, an accurate determination of a weight W needed to cancel the interference can be made. A weight control signal 110 is issued by processor 109 to control weight 111. Best results are achieved when processor 109 uses a correlation process to compare the amplitude and phase of signals 105, 108. Correlation allows interference to be cancelled to a level below that of the wanted signal.

Thus, the apparatus reduces the effect of narrow band interference by reducing the amount of power entering the demodulation apparatus by analogue cancellation prior to processing in the ADC. The digital subscriber service is provided differentially on the phone line, but the interference is coupled differentially onto the phone line by common mode to differential-mode coupling. In, for example, telephone networks, in order to perform analogue cancellation of interferers from the differential signal, the common mode signal from the cable can be used as the local field signal and will be adjusted in amplitude and phase by a single complex weight and combined with the differential signal in anti-phase to form a resultant interference signal of reduced amplitude. This process allows the interference to be reduced significantly and the wanted signal to remain, virtually unaffected.

To effectively cancel interference the interferer should be detected in quite a narrow bandwidth so that the interference is seen quite clearly above any noise or other signal. This would usually require extra filtering to exclude other signals and noise that would interfere with the required signal. One of the advantages of using a FFT as a signal processor is that narrow band filters are already provided in the configuration, and the output of the FFT decoder provides an accurate indication of the interferer.

This type of demodulator is particularly suited to this method of interference cancellation since most of the detection and filtering is performed by the architecture for the demodulator.

It is to be noted that the particular embodiment is described with reference to a twisted pair transmission line. Data could reach the demodulator by other forms of transmission line.

What is claimed is:

1. A digital data system processor having a first input to receive a differential signal and a second input to receive a local field signal, the processor being arranged to:

separately process the differential and local field signals;

compare characteristics of the processed differential and local field signals to derive a weight control signal;

set a weight according to the weight control signal;

sum a weighted portion of the local field signal with the differential signal whereby to minimise or cancel interference in the differential signal.

2. A digital data system processor comprising:

a first input to receive a differential signal;

a second input to receive a local field signal;

a summer coupled to the first input;

a first signal processor coupled to an output of the summer for processing the differential signal;

a second signal processor coupled to the second input for processing the local field signal;

a comparison processor coupled to outputs of the first and second signal processors arranged to compare characteristics of the processed signals and to derive a weight control signal; and a weight coupled between the second input and the summer and being responsive to the weight control signal, whereby a weighted portion of the local field signal is summed with the differential signal to minimise or cancel interference in the differential signal.

3. A digital data system processor according to claim 2 wherein the differential and local field signals are derived from a common transmission line, the local field signal being a common-mode signal from the line.

4. A digital data system processor according to claim 2 wherein the comparison processor compares amplitudes of the processed local field and differential signals.

5. A digital data system processor according to claim 2 wherein the comparison processor compares the phase of the processed local field and differential signals.

6. A digital data system processor according to claim 2 wherein the comparison processor is a correlator which correlates characteristics of the local field and differential signals.

7. A digital data system processor according to claim 2 wherein the signal processors comprise a cascade arrangement of an analogue-to-digital converter, and a Fast Fourier Transform decoder.

8. A digital data system processor according to claim 2 wherein the weight is a complex weight which scales the local field signal in amplitude and phase.

9. A telecommunications system including a processor according to claim 1 wherein a subscriber loop carries a wanted signal to the processor at a subscriber's premises by differential-mode, and wherein radio frequency interference (RFI) induced in the common-mode of the loop is used to minimise RFI appearing in the differential-mode.

10. A method of reducing the effect of interference in a digital data processor which receives a differential signal at a first input and a local field signal at a second input, the method comprising:

separately processing the differential and local field signals;

comparing characteristics of the processed differential and local field signals to derive a weight control signal;

setting a weight according to the weight control signal;

summing a weighted portion of the local field signal with the differential signal whereby to minimise or cancel interference in the differential signal.

11. A method according to claim 10 wherein the characteristics which are compared include amplitudes of the processed local field and differential signals.

12. A method according to claim 10 wherein phase of the demodulated local field and differential signals is compared.

13. A method according to claim 10 wherein the characteristics of the local field and differential signals are correlated.

14. A method according to claim 10 wherein the weighted portion of the local field signal is a complex weighted portion which is scaled and phase-shifted.

15. A method according to claim 10 wherein a plurality of iterations are performed, each iteration comprising the steps of comparing characteristics of the processed differential and local field signals to derive a weight control signal, setting a weight according to the weight control signal, and summing a weighted portion of the local field signal with the differential signal at the first input whereby to establish a weight which minimises or cancels interference in the differential signal.

* * * * *